Sept. 19, 1950      W. H. APPS      2,522,852

INSERT BRACELET

Filed Feb. 7, 1948

Inventor

William Apps

By Thomas A. Jenckes

Attorney

Patented Sept. 19, 1950

2,522,852

UNITED STATES PATENT OFFICE 2,522,852

INSERT BRACELET

William H. Apps, Attleboro, Mass., assignor to Union Plate and Wire Co., Attleboro, Mass., a corporation of Massachusetts Application February 7, 1948, Serial No. 6,966

3 Claims. (Cl. 63—7)

My invention relates to improvements in insert bracelets of the type comprising two semi-circular halves each having a base plate, having short upstanding side walls which may be externally ornamented, if desired, and a top plate inserted on said side walls near the top thereof providing continuous pockets between said base and top plates for receiving the plates of hinge means which may be soldered thereto at adjacent ends of each half and for receiving suitable latch means having a portion insertable within and soldered to said pockets in the opposite adjacent ends thereof.

In the prior art, for this purpose the inner portions of said side walls adjacent the top thereof have been provided with the countersunk rims projecting inwardly therefrom providing tracks radially inset from the tops of the outer edges thereof on which the semi-circular top plates have been mounted to secure the top plates on said rims or tracks. It has been necessary in the prior art to solder the top plates thereto throughout the lengths thereof by one operation and then assemble the two halves together in the manner explained by soldering the respective hinge plates and latch means within the ends of said adjacent pockets requiring two soldering operations.

The top plates and base plates have usually been manufactured by one type of manufacturer having suitable shaping, that is, rolling or drawing equipment, and the top plates and base plates have been sold in disassembled form to the ultimate jewelry assembler and said jewelry assembler therefore has had to perform two soldering operations, i. e., (1) to solder each top plate to its underlying rims or tracks throughout the entire length thereof, a slow, expensive and difficult operation, and (2) the separate soldering operation of attaching the two parts together by soldering the respective hinge and latch means thereto at each end thereof. The step of continuously soldering the top plates to their underlying tracks or rims has required considerable skill to get an even soldering throughout the length thereof and has often resulted in the solder showing on the exposed surfaces of the finished article, thereby covering portions of the design and in addition so much solder has to be used that the ultimate manufacturer, if selling precious metals such as gold-filled articles, could no longer guarantee the carat thereof.

Employing my invention, however, instead of providing the radially inset rims or tracks, I suitably form an internal groove adjacent the top of each side wall of the base plate aligned respectively with a groove in the opposite side wall providing the same continuous radially inset track underneath it with a superimposed spaced annular lip above it, thereby firmly retaining the edges of the top plate inserted within said grooves to said base plate without the necessity of soldering them thereto throughout the length thereof.

With my improved construction, it is merely necessary to slide a resilient top plate within said grooves from one end of a section. Employing my invention, the initial manufacturer having the shaping equipment, forms a continuous piece or continuous strip of flat stock base plate forming strip having short upstanding side walls having aligned, internal grooves immediately adjacent the tops thereof, cuts off said strips in the lengths equivalent when bent to one-half a bracelet, cuts off similar lengths of resilient flat stock of a width substantially the distance between said grooves to form bracelet top plates, bends said cut off base plates to semi-circular shape and slides said resilient top plates longitudinally within said grooves on said base plate from an end thereof to provide semi-circular bracelet members having pockets in each end thereof between said base and top plates, which said so assembled members in half bracelet form may then be sold to the ultimate jewelry assembler. This method of procedure is entirely novel with me and all the assembling manufacturer has to do is to insert respective hinge plate portions and flat latch means portions within the respective adjacent ends of said pockets in two of said so formed bracelet halves and by simultaneously soldering said portions within said pockets in similar fashion to his final soldering operation in the prior art, is able simultaneously by the similar single soldering operation to affix the ends only of said top plates to said base plates and said hinge and latch means portions to the ends of both said plates to make up a bracelet with a single soldering operation, eliminating entirely the long and difficult soldering of the top plate to the base plate along each edge thereof throughout the length thereof and providing a structure having substantially no solder therein except at the ends of the respective base and top plates and where the hinge means and latch means are attached thereto, it being obvious that with this construction there is no chance for solder to cover any portion of the bracelet intermediate the extreme ends of the halves as was quite common in the prior art and so little solder therein that the manufacturer can guarantee the carat thereof.

An object of my invention, therefore, is to entirely eliminate one soldering operation, with its consequent large cost and danger of spoiling much stock.

A further object of my invention is to provide a method of assembling bracelets which can be accomplished with less experienced help, i. e., the elimination of expert solderers, thought necessary in the prior art.

A further object of my invention is to provide as a new article of manufacture a bracelet constructed in accordance with the explained method in which each top plate is positively rigidly joined to its base plate through the length thereof without any solder except at the ends thereof, so that the carat thereof can be guaranteed by the manufacturer.

These and such other embodiments of my invention as may hereinafter appear will be best understood from a description of the drawings which illustrate an embodiment thereof.

In the drawings, Fig. 1 is a perspective view of an insert bracelet constructed in accordance with my invention.

Figures 4, 5:
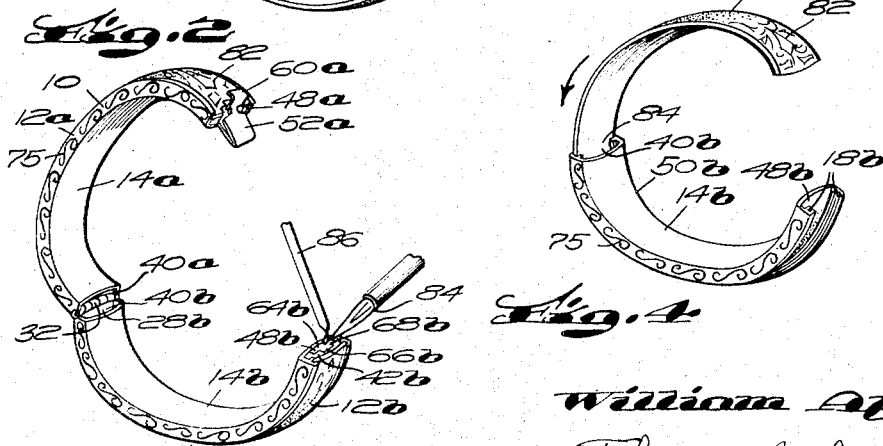
Fig. 4 is a perspective view illustrating how a top plate may be slid into the internal grooves on each side wall of a base plate from one end thereof.

Fig. 5 is a perspective view illustrating the one soldering step necessary, i. e., of soldering the hinge plates to adjacent ends of the bracelet halves and also soldering portions of the latch means therefor within the pockets formed by my invention at the ends of each bracelet half between the top and base plates, said soldering operation also simultaneously soldering the ends of the top plates to the ends of the base plates and the inserted respective latch or hinge means portions to said plates to make up the complete bracelet.

In the drawings, wherein like characters of reference generally indicate like parts throughout, 10 generally indicates an insert bracelet constructed in accordance with my invention. Each bracelet comprises two semi-circular halves 12a and 12b, each comprising a flat semi-circular base plate 14a and 14b respectively having the flat base shown and the relatively short upstanding sidewalls 16a and 16b respectively. If desired, said side walls may be externally ornamented, as shown. Said side walls 16a and 16b have aligned internal grooves 18a and 18b immediately adjacent the tops thereof comprising an underlying annular rim or track 20a and an overlying annular rim or lip 22a a spaced radial distance above it, providing a circumferential groove 18a between said track 20a and lip 22a. As stated, in the prior art the overlying lip 22a has not been present, requiring the necessity of soldering the edges of the top plate 24a to each rim 20a throughout the length thereof. Employing my construction, however, this soldering throughout the length thereof is omitted as the overlying lip 22a retains the edges of the top plate 24a within said groove 18a without the necessity of any solder, my invention, therefore, comprising the fact that I add the overlying lip 22a radially above said underlying rim or track 20a so that the lip or rim 22a will substantially retain the edges of said top plate 24a on said track 20a within said groove 18a. I also employ a semi-circular top plate 24a having its edges 26a contained within said grooves 18a to provide a spaced semi-circular pocket 28a throughout the length of said bracelet half. If desired, the top plate 24a may have its outer surface suitably ornamented as shown at 82.

In making up insert bracelets, it has been common to employ hinge means for joining adjacent ends 30a and 30b of said bracelet halves together, said hinge means 32 comprising the hinge plates 34a and 34b having alternate ears 36 projecting alternately throughout the width thereof from each respective plate 34a and 34b with the hinge pin 38 inserted between said ears and having the ends thereof upset to stay in position. In the prior art the respective hinge plates 34a and 34b have been inserted in respective adjacent ends 40a and 40b of the pockets 28a and 28b and suitably soldered thereto. It has also been customary to employ latch means such as the flat female socket member 42b having a latching socket 44b in the outer end thereof contained and soldered within the opposite end 48b of the pocket 28b of the bracelet half portion 50b and suitably soldered within the end 48b of said pocket. To complete the latch, a flat male latch member 52a has been provided having a base plate 54a contained within and soldered to the opposite end 48a of the pocket 28a in the opposite half 50a. Said latch member 52a has the male latch protuberance 56a projecting from the outer end thereof insertable within said female latch socket 44b and suitably latchable thereto, in the embodiment shown said latch comprising an extension 58a bent rearwardly and upwardly and terminating in a semi-circular operating handle 60a. The upper portion of the upstanding portion 58a adjacent said handle 60a is provided with the cut-away portions 62a adjacent each side wall thereof. The female socket 42b is provided with an enlarged inner portion 64b and an upper portion 66b of less respective width. With this construction, the handle 60a of the latch is depressed to bring the extension 58a adjacent the protuberance 56a below it, so that both portions may be inserted within the wider inner socket portion 64b. Then, when pressure is released from said handle 60a said portion 58a will spring outwardly with the depending edges 68b formed in the end of said female socket member receiving said slots 62a so that the edges of said slots may abut the depending edges 68a to retain the bracelet in latched position. It is obvious, however, that any suitable type of a latch may be employed, although I have described and explained a latch commonly used in bracelets of this description. After said respective hinge plates 34a and 34b have been inserted in the respective ends 40a and 40b of said pockets 28a and 28b, they are suitably soldered thereto which soldering operation not only secures the hinge plates 34a and 34b to the ends of the base plates 14a and 14b and top plates 24a and 24b, but also secures said ends of said top plates 24a and 24b to the respective ends of said base plates 14a and 14b. Each respective male part 52a and female part 42b of the latch member is similarly soldered within its respective end 48a and 48b of the respective pockets 28a and 28b to the ends of said respective base plates 14a and 14b and top plates 24a and 24b, simultaneously soldering the ends of said top plates 24a and 24b to the ends of the base plates 14a and 14b.

Figure 1:
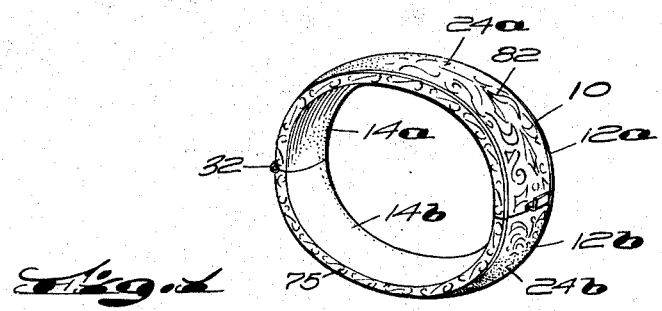
Figures 2, 3:
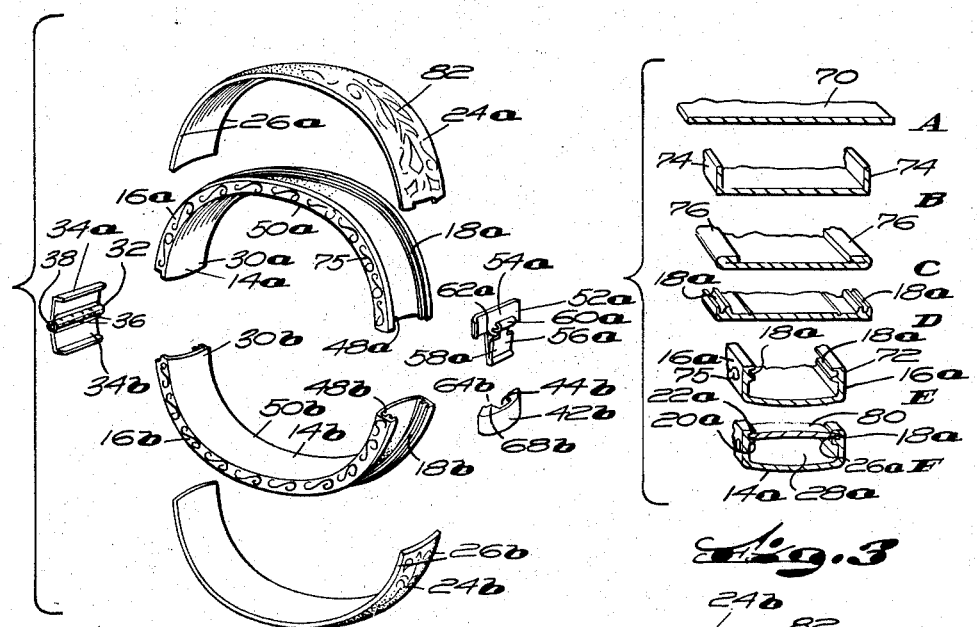
Fig. 2 is a diagrammatic exploded perspective view of the parts thereof.
Fig. 3 is a diagrammatic sectional view illustrating how the base plates of my improved bracelet are manufactured from the flat stock and the top plate inserted therein.

It is apparent that my improved structure permits a novel method of assembly entirely eliminating the necessity of soldering the top plates 24a and 24b to the radially inset rims 20a and 20b of said base plates 14a and 14b throughout the length thereof. As shown in Fig. 3, steps A, B, C and D, I suitably shape a continuous strip 70 of flat stock to a base plate forming strip 72 (see step E) having short upstanding side walls 16a or 16b having the internal grooves 18a and 18b adjacent the tops thereof. While this may be done in any suitable fashion, such as by drawing or rolling, it is preferably accomplished in the sequence of steps A—E shown in Fig. 3. The temporary side wall portions 74 are first drawn upwardly as suggested in step B. These are then rolled over downwardly into the position 76 shown in step C. These rolled over portions 76 may then be simultaneously grooved as at 18a or 18b by suitably shaped rollers pressed in from above. The side walls 16a or 16b may then be suitably drawn upwardly as shown in step E when the manufacture of the continuous base plate forming strip is complete. If desired, the side walls may be externally ornamented as at 75 as shown prior to being drawn up after having an ornamenting roller applied to the lower surface thereof simultaneously with the application of the roller forming the groove in step D. Said strip may then be cut off into lengths equivalent when bent to half a bracelet. I also form a similar strip of resilient flat stock 80 of a width substantially the distance between said grooves 18a or 18b. I also cut off similar lengths to the lengths of cutoff base plates 14a and 14b from said top plate strip 80 corresponding to the lengths of desired top plates 24a and 24b. If desired, the outer surface of the top plates may be suitably ornamented by rolling or otherwise as at 82. I then bend said cutoff base plates 14a and 14b and cutoff top plates 24a and 24b to form semi-circular shapes. As shown in Fig. 4 one end 84 of a top plate such as the top plate 24b may be brought adjacent one end 40b or 48b of a base plate 14b. If desired, said top plate section 24b may be straight as cut off or partially bent as shown by hand or otherwise before inserting it into the grooves 18b of the base plate 14b shown. The top plates 24a and 24b slide in this manner within the grooves 18a and 18b until the respective ends thereof are flush with respective ends of their base plate section 14a or 14b to make up the bracelet section 50b or 50a ready for shipment to the ultimate jewelry assembling manufacturer.

It will be obvious that the work of the jewelry assembling manufacturer is much lessened. He will no longer have to do the difficult soldering jobs of soldering the edges of the top plate 24a or 24b to the rims 20a or 20b of the base plates 14a or 14b. He merely will have to repeat the same operation hitherto described of attaching and soldering the respective hinge and latch means to the respective ends of the half bracelet sections and this same soldering operation will automatically secure the respective ends of the top plates 24a and 24b to their respective ends of the base plates 14a or 14b. Thus, in similar manner as hitherto described, the respective hinge plate portions 34a and 34b are inserted within the respective ends 40a or 40b of the respective pockets 28a and 28b and the respective plate 54a of the male latch member and the respective female socket member 42b are inserted within the opposite adjacent ends 48a and 48b of said pockets 28a and 28b and as said respective hinge plates 34a and 34b are soldered within the respective ends 40a and 40b of said pockets and said respective male plate 54a and female socket 42b are soldered within their respective ends 48a and 48b of the respective pockets 28a and 28b in the manner hitherto described, the ends only of said top plates 24a and 24b will also be soldered to the respective ends of said base plates 14a and 14b as said respective hinge and latch means portions are soldered to the ends of both plates to make up a bracelet with one single soldering operation identical to the soldering operation performed in the prior art for soldering the said respective hinge means portions and latch means portions to the respective ends of the sockets 28a and 28b. I have shown the blow-torch 84 melting solder from the solder pencil 86 for this purpose, although any known method of soldering, electric or otherwise, may be employed.

It is thus apparent that the long, tedious and expensive operation of soldering the edges of the top plates 24a and 24b to said tracks 20a and 20b throughout the length thereof is eliminated, omitting the danger of the solder covering portions of the design thereof which inevitably happened in the prior art despite the great care used in soldering and providing an insert bracelet structure having so little solder therein that its carat can be guaranteed by the ultimate manufacturing jeweler.

It is apparent that I have provided not only improvements in structure of insert bracelets, providing a better bracelet but that I have so designed my bracelet structure as to permit a new method of manufacture and assembly eliminating an entire step formerly thought necessary in the prior art and that I have so designed my method of manufacture and assembly that it may be readily accomplished with my improved structure of bracelet.

It is also apparent that I have provided a novel type of insert bracelet with the advantages hitherto set forth.

It is understood that my invention is not limited to the specific embodiments shown or methods described and that various deviations may be made therefrom without departing from the spirit and scope of the appended claims.

What I claim is:

1. An insert bracelet comprising two semi-circular halves each comprising a flat semi-circular base plate having short upstanding externally ornamented side walls having aligned internal grooves immediately adjacent the tops thereof, said grooves being spaced from said base plate, and a semi-circular externally ornamented top plate having flat unturned edges, said edges being contained within said grooves to provide a spaced semi-circular pocket between said base and top plates, a hinge member having hinge plates contained and soldered within the ends of said pocket in adjacent ends of said halves and latch means comprising a flat female socket member having a latching socket in the outer end thereof contained and soldered within the opposite end of one half and a flat male latch member having a base plate contained and soldered within the opposite end of the other half, having a male latch protuberance projecting from the outer end thereof insertable and latchable within said female latch socket, said solder also rigidly securing the ends of said top plates to the ends of said grooves in the base plates.

2. A bracelet comprising two semi-circular halves, each half comprising a base plate and two side walls, a first and second rim member extending inwardly from each of said side walls and being parallel to said base plate, said first rim member being located at the top of its supporting side wall, said second rim member being spaced between the base plate and said first rim member thereby providing a groove between the rim members, a flat resilient top strip extending from end to end of each semi-circular half and having unturned edges contained within the groove of each side wall to provide a semi-circular pocket in each half, a hinge having plates contained in one end of each half, latch means comprising a male member and a female member, said male member being contained in the other end of one semi-circular half and said female member being contained in the other end of the other semi-circular half so that said halves may be locked together when the bracket is closed, said hinge and latch means being fixed in their respective positions by solder which solder also secures the ends of said top strips to the ends of said groove.

3. An insert bracelet comprising two semi-circular sections, each section comprising a base plate, side walls and a top plate, each side wall having an internal rim and an internal track, said rim being located at the top of its side wall, said track being spaced between said rim and said base plate to provide a groove between said rim and said track and a pocket between said track and said base plate, said top plate having flat edges which extend into said grooves, hinge means interconnecting one end of each of said sections, latch means interlocking the other ends of said sections, said latch means and said hinge means being soldered into the ends of said pockets so as to rigidly secure said hinge means and said latch means to the inside walls of said top plates, base plates and side walls.

WILLIAM H. APPS.

REFERENCES CITED

The following references are of record in the file of this patent:

UNITED STATES PATENTS

| Number | Name | Date |
| --- | --- | --- |
| 306,290 | Sherman | Oct. 7, 1884 |
| 357,326 | Lord | Feb. 8, 1887 |
| 1,051,903 | Mason | Feb. 4, 1913 |
| 1,916,821 | Bigney | July 4, 1933 |
| 2,180,980 | Fassnacht et al. | Nov. 21, 1939 |